United States Patent Office 2,726,144
Patented Dec. 6, 1955

2,726,144

PRODUCTION OF PURE COBALTIC HYDROXIDE

Albert Edward Wallis and John Pincott, Clydach, Swansea, England, assignors to The International Nickel Company, Inc., New York, N. Y., a corporation of Delaware No Drawing. Application May 12, 1953,
Serial No. 354,655

Claims priority, application Great Britain July 12, 1951

3 Claims. (Cl. 23—183)

The present invention relates to the production of pure cobaltic hydroxide and more particularly to the production of pure cobaltic hydroxide from aqueous solutions of mixed salts containing both cobalt and nickel by adding nickelic hydroxide to the solution and thereby producing a precipitate of crude cobaltic hydroxide, which, upon subsequent purification by treatment with an acidic solution, will yield a much purer cobaltic hydroxide than heretofore.

Attempts have been made to produce a pure cobaltic hydroxide from solutions containing mixed salts of cobalt and nickel. Available methods enabled the production of nickel-containing cobaltic hydroxides having a cobalt-nickel ratio of about 20:1 to 25:1 as initially precipitated (see U. S. Patent No. 2,377,832) and of about 70:1 after subsequent purification (see U. S. Patent No. 2,415,665) on a commercial scale. It has even been possible by repeating the purification cycle numerous times to prepare a cobaltic hydroxide having a cobalt-nickel ratio of about 140:1; but this process, involving numerous repetitions of the purification cycle, is not feasible for large scale operations. In no case has it been possible by any large scale operation to produce cobaltic hydroxide completely devoid of nickel or substantially devoid of nickel, e. g., having a cobalt-nickel ratio of the order of 320:1 or higher, from solutions containing mixed salts of cobalt and nickel. These pure cobaltic hydroxides are in demand as a large scale source of exceedingly pure cobalt called for by the electronics industry, the hard tool tip (tungsten carbide-cobalt) industry and for certain heat and creep resistant alloys where even the smallest amount of impurities may have a harmful effect.

Although many attempts were made to overcome the foregoing difficulties and other difficulties none, as far as we are aware, was entirely successful when carried into practice commercially on an industrial scale.

It has now been discovered that by critically modifying the prior art process, a new and unobvious result is obtained, i. e., a pure cobaltic hydroxide is produced despite the fact that the original solution contained both nickel and cobalt.

It is an object of the present invention to provide a means for recovering cobalt, completely or substantially devoid of nickel, as cobalt hydroxide from aqueous solutions containing both nickel and cobalt wherein precipitation with a nickelic hydroxide precipitant prepared under critical conditions is carried out under conditions which are critically controlled to provide an impure precipitate of cobaltic hydroxide, containing less than 10% of nickel based on the total metal content of the precipitate, which, when subsequently purified, will yield a pure cobaltic hydroxide precipitate.

Other objects and advantages will become apparent from the following description.

Broadly stated, the present invention provides a process for producing a final cobaltic hydroxide substantially devoid or devoid of nickel comprising producing at a pH between about 1 and about 2.4 an initial nickel-containing cobaltic hydroxide precipitate from a substantially iron-free aqueous acid solution containing both nickel and cobalt and having a temperature not exceeding about 12° C. by adding thereto a substantially iron- and cobalt-free nickelic hydroxide precipitant (as such or as a hydrated nickel oxide), itself prepared by precipitation at a low temperature not exceeding about 8° C., and thereafter digesting this initial impure nickel-containing cobaltic hydroxide precipitate in the presence of an acidic aqueous solution containing a cobalt salt and having a pH of about 1.5 to about 2 and a temperature of at least about 70° C. to remove nickel impurity from the initial cobaltic hydroxide precipitate and to produce a final pure cobaltic hydroxide which is substantially or entirely devoid of nickel.

In accordance with the present invention, the nickelic hydroxide is prepared by precipitation from a solution of a nickel salt at a low temperature between about 0° C. and 8° C., preferably at about 5° C. For example, the nickelic hydroxide precipitant may be prepared at low temperature by adding an alkali, such as a sodium hydroxide solution, to a solution of a nickel salt, such as nickel sulfate, nickel chloride, etc., to precipitate nickelous hydroxide and then oxidizing the precipitate to the nickelic form by means of an oxidant such as sodium hypochlorite. Of course, other alkalis, such as solutions of potassium hydroxide, sodium carbonate, sodium bicarbonate, etc., may be used. Likewise solutions of other nickel salts, such as chloride, nitrate, acetate, etc., may be used. Similarly, other oxidants, such as hydrogen peroxide, sodium persulphate, anodic oxygen and chlorine, etc., may be used. It is essential that the solutions be substantially devoid of iron and cobalt, i. e., contain not more than about 0.1 g. p. l. (grams per liter) of iron and 0.5 g. p. l. of cobalt, so that the resulting nickelic hydroxide produced will be substantially free of iron and cobalt, i. e., at least 99.6% of the total metal content of the nickelic hydroxide precipitant will be nickel. This can be accomplished by any suitable means, e. g., the initial nickel-containing solution can be purified by adding a small amount of nickelic hydroxide to precipitate the iron and cobalt and then filtering off the precipitate.

Satisfactory results have been obtained when using as the nickel solution a solution containing from about 80 g. p. l. to about 120 g. p. l. and preferably about 100 g. p. l. of nickel sulfate, by utilizing as the alkali a sodium hydroxide solution containing between about 50 g. p. l. and about 150 g. p. l. and preferably about 100 g. p. l. of sodium hydroxide and by utilizing as the oxidant a sodium hypochlorite solution containing between about 15 g. p. l. and about 40 g. p. l. and preferably about 20 g. p. l. of sodium hypochlorite. In one instance, a satisfactory nickelic hydroxide precipitant was prepared at a temperature of about 5° C. by adding a small excess of solution containing 100 g. p. l. of caustic soda (sodium hydroxide) to a solution of nickel sulfate to precipitate nickelous hydroxide. A 20 g. p. l. solution of sodium hypochlorite was then added to oxidize the nickelous hydroxide to nickelic hydroxide. Usually sufficient excess of the sodium hypochlorite solution was added so that the resulting nickelic hydroxide has an available oxygen content of 8-9 grams per gram equivalent of nickel. The nickelic hydroxide precipitate was then separated from the mother solution by known separating processes, e. g., filtration.

In carrying to completion the process embodying the present invention it has been found that if any nickel is present in the final purified cobaltic hydroxide, it is present in very minor amounts such that the ratio of cobalt to nickel is not less than 200:1. Thus, when the initial impure cobaltic hydroxide precipitate was prepared at a reaction temperature of 10° C. using a precipitant prepared in the foregoing special manner, a cobalt-nickel ratio in the final pure cobaltic hydroxide of 250:1 was obtained. In carrying out the present invention, it is preferred that the temperature during the precipitation of the initial impure nickel-containing cobaltic hydroxide not exceed about 9° C. as in this manner the ratio of cobalt to nickel in the final pure cobaltic hydroxide obtained by purification of the impure precipitate will not be less than about 300:1. Thus, when the initial impure cobaltic hydroxide precipitate was prepared at a precipitation temperature of 9° C. using the aforementioned precipitant prepared in the specified manner, the final purified cobaltic hydroxide had a cobalt to nickel ratio of 320:1 and when the initial precipitation with the special precipitant was carried out at a temperature of 5° C., the cobalt to nickel ratio of the final pure product was infinity, i. e., the final pure cobaltic hydroxide precipitate was nickel free. The precipitation of the impure cobaltic hydroxide can be carried out at temperatures even lower than 5° C., for example, as low as 0° C.

In the practice of the present invention satisfactory results are obtained by treating with the special precipitant initial aqueous acid solutions containing from about 40 to about 140 g. p. l. of nickel as a soluble nickel salt and from about 6 to about 30 g. p. l. of cobalt as a soluble cobalt salt (the cobalt and nickel salts usually, but not necessarily, being chlorides or sulfates). The pH of the initial nickel-containing cobalt solution is held within the range of about 1 to about 2.4 during the precipitation of crude cobaltic hydroxide and the pH can be adjusted within this range either before or after the addition of the pure nickelic hydroxide precipitant, itself prepared at a low temperature. The resulting initial crude precipitate of impure cobaltic hydroxide will contain less than about 10% of nickel based on the total metal content and will usually contain about 7% of nickel, i. e., will have a cobalt to nickel ratio of about 15:1.

It is further contemplated that in practice the aqueous acid solution used to digest the initial impure or crude cobaltic hydroxide precipitate to produce the pure cobaltic hydroxide can contain from about 5 to about 6 g. p. l. of cobalt as a water soluble cobalt salt. At least one-quarter liter of said aqueous acid solution must be used in the purification for each gram of nickel in the impure or crude cobaltic hydroxide.

That portion of the new process in which the impure or crude cobaltic hydroxide is purified may be carried out as described hereinbefore or may be varied somewhat as described hereinafter. Thus, the impure cobaltic hydroxide may be treated with a mineral acid solution, e. g., hydrochloric or sulfuric acid, having an initial pH of between about 0.9 and about 1.5 and at a temperature between about 35° C. and about 100° C. This acid will dissolve some of the impure cobalt precipitate (the pH rising as the cobalt is dissolved) and the dissolution will stop when the pH is raised to about 1.5. In this manner, the cobalt-containing salt solution is produced in situ. When the temperature is now raised to above about 70° C. (if it was initially below 70° C.), an exchange reaction between the nickel in the impure cobaltic hydroxide precipitate and the dissolved cobalt will occur and continue until the cobaltic hydroxide has been purified. When the cobalt-containing salt solution is produced in situ in the foregoing manner by digestion of the impure cobaltic hydroxide with a mineral acid, a reducing agent, for example, sodium sulfite, sodium bisulfite, sulfur dioxide gas, reduced cobalt oxide, etc., or mixtures of such suitable reducing agents, can be added to facilitate the dissolution of the requisite quantity of cobalt and to permit this dissolution to continue up to a pH of 2 instead of taking place within the narrower pH range of 0.9 to 1.5. When a reducing agent is used in conjunction with the mineral acid, the initial pH of the acid solution may be between about 0.9 and about 2. In the pH range of 1.5 to 2, the reducing agent acts to cause dissolution of a portion of the cobalt from the precipitate which would not dissolve in the absence of the reducing agent in this pH range. The purification of the impure cobaltic hydroxide precipitate proceeds in the pH range of about 1.5 to about 2. As will be readily apparent to those skilled in the art, the type of process described herein can be carried out in either a batch process or continuous process, preferably employing the principles of counter-current flow.

In carrying the invention into practice, a preferred embodiment comprises adding as the precipitant pure nickelic hydroxide prepared at low temperatures to the nickel- and cobalt-containing solution at about 5° C., and then adjusting the pH to about 1.8. The resulting impure cobaltic hydroxide precipitate is treated at about 20° C. with an acid solution having a pH of about 1 and containing a reducing agent, e. g., sodium sulfite. The precipitate is then purified by heating the solution to about 70° C. to 90° C. When the pH has risen to about 1.7, it is maintained at that value. After the reaction has reached completion, the cobaltic hydroxide precipitate is separated from the solution and will be found to be substantially nickel-free.

For the purpose of giving those skilled in the art a better understanding of the invention and appreciation of its advantages, illustrative examples will now be given.

Cobalt-free nickelic hydroxide precipitant prepared as specified hereinbefore was added to a sulfate solution having a pH of 3.5, a temperature of 5° C., and containing 100 g. p. l. of nickel and 12 g. p. l. of cobalt. The pH was then adjusted to 1.8. After the solution was stirred for 5 hours, the precipitate was separated by filtration and then washed. The ratio of cobalt to nickel in this initial crude cobaltic hydroxide precipitate was 15:1. This initial precipitate was then slurried up with water at 20° C., acidified to a pH of 1.0 by adding sulphuric acid and sufficient sodium sulfite was added to reduce 10% of the total cobalt in the initial crude cobaltic hydroxide precipitate to the cobaltous condition in a dissolved state. The slurry was then heated to 90° C. and the pH was maintained at 1.7. After 4 hours the precipitate was filtered and again washed. This purified cobaltic hydroxide precipitate was found to be nickel-free.

A number of other purified cobaltic hydroxide precipitates were prepared in the same manner as described in the preceding example except that the initial precipitation with the special precipitant was carried out at various temperatures within the range contemplated by the present invention. Such a purified cobaltic hydroxide precipitate as initially precipitated at 9° C. had a cobalt to nickel ratio of 320:1, a purified cobaltic hydroxide initially precipitated at 10° C. had a cobalt to nickel ratio of 250:1, and a purified cobalt hydroxide precipitate initially precipitated at 12° C. had a cobalt-nickel ratio of 230:1. Thus, it is most preferable that the precipitation temperature should be as low as 5° C. since then the cobalt to nickel ratio is very high indeed, but at a precipitation temperature of 9° C., a ratio of the order of 320:1 is obtainable and at a temperature of 12° C., the ratio is of the order of 230:1. When it is stated herein that the cobaltic hydroxide is "pure" or that the product obtained after purification is "pure cobaltic hydroxide," it is meant that the cobaltic hydroxide has a ratio of cobalt to nickel of at least 200:1 and more preferably at least about 300:1.

The ratios quoted above for the pure cobaltic hydroxide are obtained only when the nickelic hydroxide precipitant is itself substantially iron- and cobalt-free and is prepared at low temperatures as specified hereinbefore. For example, a nickelic hydroxide precipitant was produced at about 5° C. from a cobalt-contaminated solution, which contained 2.0 parts of cobalt for each 100 parts of nickel. When this precipitant was added at 5° C. to an initial liquor containing dissolved cobalt and nickel, it was found that the resultant impure precipitate or cake after purification and washing had a cobalt to nickel ratio of only 150:1. As a comparison, another nickelic hydroxide precipitant was prepared at 5° C. from a cobalt-free and iron-free nickel solution. When this precipitant was added at 5° C. to more of the same initial liquor, it was then found that the cobaltic hydroxide precipitate after purification and washing contained no nickel. It is therefore an important feature in the production of very pure cobaltic hydroxide in accordance with the present invention that the nickelic hydroxide precipitant should be free or substantially free from cobalt and iron, i. e., should contain not more than about 0.5 part of cobalt and not more than 0.1 part of iron for each 100 parts of nickel.

The importance of using nickelic hydroxide prepared at a low temperature is shown by the fact that cobaltic hydroxide having a cobalt to nickel ratio of the order of 230:1 is obtained when such nickelic hydroxide is used as the precipitant to precipitate the cobaltic hydroxide at 12° C., whereas with the use of nickelic hydroxide precipitated at room temperature but similar in other respects the cobalt to nickel ratio in the purified cobaltic hydroxide initially precipitated at 12° C. is only of the order of 80:1. When the cobaltic hydroxide is precipitated at 9° C., the comparable figures are 320:1 and 90:1, respectively. If the cobaltic hydroxide is precipitated at 5° C. with nickelic hydroxide according to the invention, the cobalt to nickel ratio in the product is very high indeed, i. e., approaching infinity, whereas with nickelic hydroxide precipitated at room temperature, it is about 100:1.

The present invention is based on the discovery that cobaltic hydroxide of greater purity can be obtained using a specially prepared nickelic hydroxide as the precipitant and by effecting the precipitation of the crude cobaltic hydroxide at a temperature well below room temperature, i. e., at a temperature not exceeding 12° C., instead of the temperature of 40° C. to 60° C. mentioned in U. S. Patent No. 2,377,832 and in British Patent No. 570,230. The amount of chemically combined nickel which constitutes the impurity in the crude cobaltic hydroxide precipitate or cake is not necessarily lowered by the reduction in the precipitation temperature and by the use of the specially prepared precipitant. In fact, the low temperature precipitation yields an impure cobaltic hydroxide which, when analyzed for cobalt and nickel contents, is apparently no different than the impure cobaltic hydroxide produced by following the procedure described in U. S. Patent No. 2,377,832 and British Patent No. 570,230. However, in the course of the subsequent purification by the procedure described in U. S. Patent No. 2,415,665 and in British Patent No. 570,231, the precipitate produced at a low enough precipitation temperature is virtually freed from nickel and a new and vastly superior final product is obtained, viz., a pure cobaltic hydroxide containing little or no nickel as compared to the end-product, which contained in excess of 1% of nickel based on the total metal content, obtained heretofore by following the procedure described in the aforementioned patents. Thus, it is seen that, except for the utilization of the specially prepared nickelic hydroxide as the precipitant and the reduction in the temperatures of the precipitation, the process of precipitation and purification is preferably carried on exactly as described in U. S. Patent No. 2,377,832 and British Patent No. 570,230 and in U. S. Patent No. 2,415,665 and British Patent No. 570,231.

When a batch of cobaltic hydroxide was prepared by a procedure described in the patent mentioned hereinbefore wherein the impure cobaltic hydroxide was purified by a single treatment with an acidic aqueous solution initially nickel-free, it was not possible to obtain a purified cobaltic hydroxide containing less than one part of nickel for 70 parts of cobalt. Even by successive treatments with fresh nickel-free acidic solution, a purified cobaltic hydroxide product having cobalt to nickel ratios of only about 140:1 could be obtained. However, by the procedure contemplated in the present invention, it is possible by a single treatment to purify the crude cobaltic hydroxide and obtain a pure final product having a cobalt to nickel ratio of at least 200:1 and preferably at least about 300:1, e. g., infinity.

In preparing cobaltic hydroxide from initially impure solutions, iron is removed from said solutions in an operation immediately preceding the addition of the specially prepared nickelic hydroxide precipitant. The iron is precipitated and removed at elevated temperatures, i. e., above about 75° C., by oxidizing and by adding a base. After tests have indicated the substantially complete removal of the iron from the impure solutions, i. e., the solutions should not contain more than .01 g. p. l. of iron, the solutions are then refrigerated in accordance with the present invention to the low temperatures, viz., about 5° C., required for the precipitation of substantially nickel-free cobaltic hydroxide.

The present invention is particularly applicable to those needs of industry and science for pure cobalt and those pure cobalt salts and oxides which may be derived from pure cobaltic hydroxide. More particularly, pure cobalt salts and/or oxides find application in the pottery, glass, enamelling, electroplating, and paint industries, and pure cobalt finds application in the electronics industry, the hard tool-tip (tungsten carbide-cobalt) industry and for certain heat- and creep-resistant alloys, where even the smallest amounts of impurities may have a harmful effect.

It is to be observed that the present invention provides a process for the production of purer cobaltic hydroxide than produced heretofore by the process described in the patents mentioned hereinbefore. While the theory of the mechanism of the chemical reactions involved in the precipitation of the crude cobaltic hydroxide is not understood, nevertheless a pure product is consistently obtained by the process embodying the present invention.

The present application is a continuation-in-part of our copending patent application Serial No. 297,404, filed July 5, 1952, now abandoned.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. The process for producing cobaltic hydroxide of high purity which comprises, in combination, the steps of refrigerating to a temperature of about 5° C. an impure cobalt solution containing nickel as an impurity but containing no iron in amounts greater than about 0.01 gram per liter, precipitating impure nickel-containing cobaltic hydroxide from the thus-refrigerated solution at a pH between about 1 and about 2.4 by adding to said solution a substantially iron- and cobalt-free nickelic hydroxide precipitant itself prepared by precipitation at a temperature of about 5° C., and thereafter purifying said impure nickel-containing cobaltic hydroxide precipitate by digesting said precipitate at a temperature of at least about 70° C. with a substantially nickel-free aqueous solution containing dissolved cobalt and having a pH of about 1.5 to 2 to remove nickel contained in said impure cobaltic hydroxide and to provide a purified cobaltic hydroxide substantially devoid of nickel.

2. The process for producing cobaltic hydroxide substantially devoid of nickel and iron which comprises, in combination, the steps of refrigerating to a temperature not exceeding about 9° C. an impure cobalt solution containing nickel as an impurity but containing no iron in amounts greater than about 0.01 gram per liter, precipitating impure nickel-containing cobaltic hydroxide from the thus-refrigerated solution at a pH between about 1 and about 2.4 by adding to said solution a substantially iron- and cobalt-free nickelic hydroxide precipitant itself prepared at a temperature of about 5° C. by precipitation from a substantially iron- and cobalt-free solution, and thereafter purifying said impure nickel-containing cobaltic hydroxide precipitate at a temperature of at least about 70° C. by digesting said precipitate with a substantially nickel-free aqueous solution containing dissolved cobalt and having a pH of about 1.5 to 2 to remove nickel contained in said impure cobaltic hydroxide and to provide a purified cobaltic hydroxide in which the ratio of cobalt to nickel is at least about 320 to 1.

3. The process for producing cobaltic hydroxide substantially devoid of nickel and cobalt which comprises, in combination, the steps of refrigerating to a temperature of about 0° C. to 12° C. an impure cobalt solution containing nickel as an impurity but containing no iron in amounts greater than about 0.01 grams per liter, precipitating impure nickel-containing cobaltic hydroxide from the thus-refrigerated solution at a pH between about 1 and about 2.4 by adding to said solution a substantially iron- and cobalt-free nickelic hydroxide precipitant itself prepared by precipitation at a temperature of about 0° C. to 8° C., and thereafter purifying said impure nickel-containing cobaltic hydroxide precipitate at a temperature of at least about 70° C. by digesting said precipitate with a substantially nickel-free aqueous solution containing dissolved cobalt and having a pH of about 1.5 to 2 to remove nickel contained in said impure cobaltic hydroxide and to provide a purified cobaltic hydroxide in which the ratio of cobalt to nickel is at least about 200 to 1.

References Cited in the file of this patent
UNITED STATES PATENTS

| | | |
|---|---|---|
| 2,377,832 | Wallis et al. | June 5, 1945 |
| 2,415,665 | Wallis et al. | Feb. 11, 1947 |

U. S. DEPARTMENT OF COMMERCE

PATENT OFFICE

CERTIFICATE OF CORRECTION

Patent No. 2,726,144                                                           December 6, 1955

Albert Edward Wallis et al.

It is hereby certified that error appears in the printed specification of the above numbered patent requiring correction and that the said Letters Patent should read as corrected below.

Column 7, line 15, for "cobalt" read -- iron --.

Signed and sealed this 22nd day of April 1958.

(SEAL)

Attest:

KARL H. AXLINE
Attesting Officer

ROBERT C. WATSON
                                                     Commissioner of Patents